Patented Sept. 12, 1922.

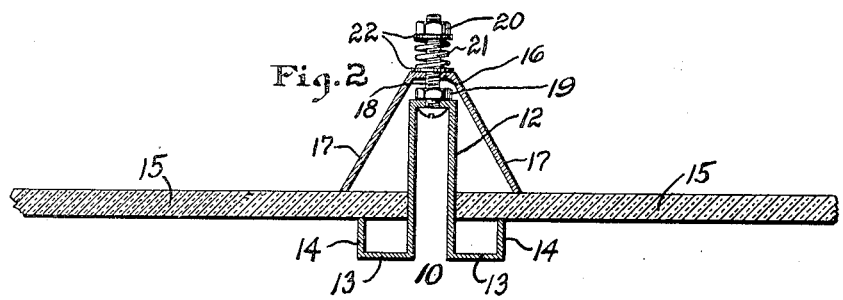
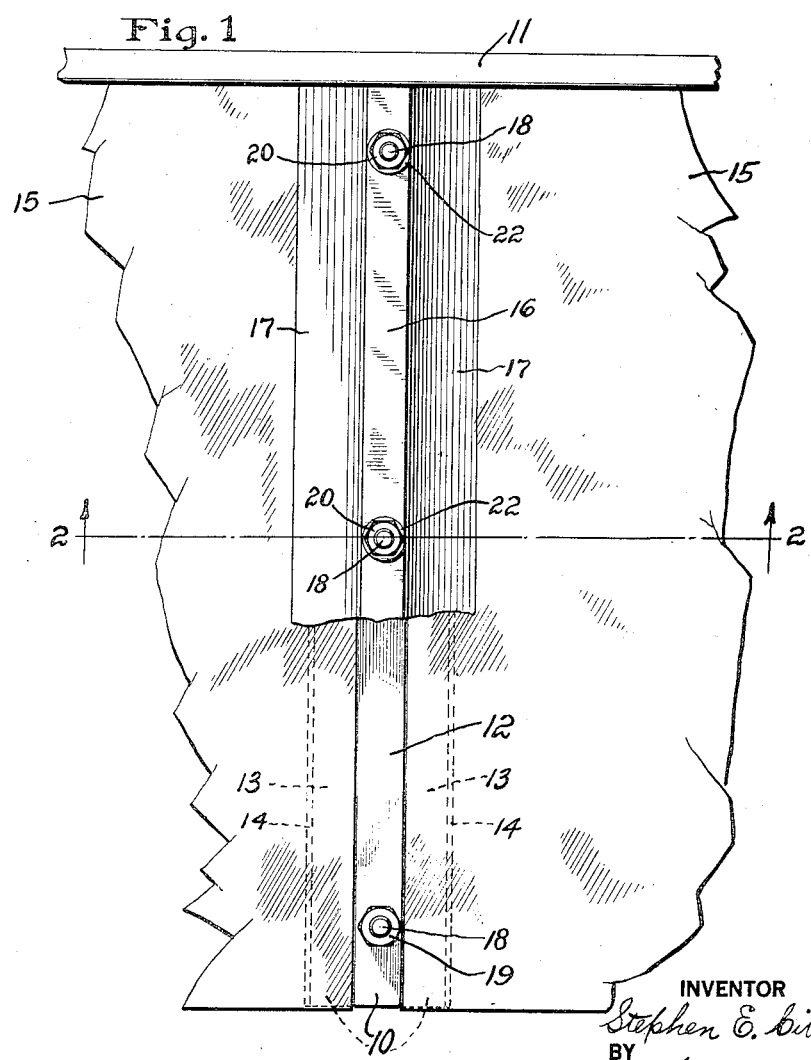

1,429,018

UNITED STATES PATENT OFFICE.

STEPHEN E. CIBULAS, OF BRIDGEPORT, CONNECTICUT.

SKYLIGHT CONSTRUCTION.

Application filed March 23, 1921. Serial No. 454,678.

*To all whom it may concern:*

Be it known that I, STEPHEN E. CIBULAS, a citizen of the United States, residing at Bridgeport, county of Fairfield, State of Connecticut, have invented an Improvement in Skylight Construction, of which the following is a specification.

This invention relates to glass holding and supporting elements for building structures, and particularly, although not exclusively, for skylights and the like, and has for its object to provide an extremely simple glass supporting and clamping device which may be made of relatively heavy sheet metal so as to make it rigid and to add greatly to the life of the structure but which shall be so constructed as to avoid danger of breaking the glass, the structure being easily assembled and otherwise of such a character as to facilitate the placing of the glass and its secure attachment in place.

Heretofore, so far as I am aware, it has been the practice to make structures of this character of relatively light sheet metal so as to provide a yielding support to the glass and thus avoid breakage. The objection to structures made of light metal has been that, in order to prevent breakage of the glass, the metal had to be so light as to greatly shorten the life of the structure, owing to deterioration of the metal when exposed to the weather.

My present invention wholly avoids this objection and provides a structure that is rigid, may be made of as heavy gauge sheet metal as may be necessary to insure durability and in which breakage of glass, through expansion and contraction of the metal, is wholly avoided.

With the foregoing and other objects in view, I have devised the novel glass holding structure which I will now describe, reference being had to the accompanying drawings, in which:

Fig. 1 is a plan view of a portion of a roof constructed in accordance with the invention, and Fig. 2 is a vertical section taken substantially on the line 2—2, Fig. 1.

10 denotes a supporting bar having its ends suitably secured in any desired manner to beams or other roof members, one of which is indicated at 11. The supporting bar 10 is made of relatively heavy sheet metal bent upon itself to provide a relatively high and narrow longitudinally extending, vertical rib 12, and to provide at opposite sides of said rib longitudinal flanges 13 formed with upwardly turned edges 14 which constitute supporting shoulders for the edges of the glass panes 15. 16 denotes a clamping bar disposed parallel to the supporting bar 10 above the same, said clamping bar being also made of relatively heavy sheet metal and being formed with longitudinally extending, downwardly and outwardly inclined side portions 17 having lower edges which engage the upper surfaces of the panes 15 and clamp the same against the shoulders 14. 18 denotes bolts projecting upwardly from the top of the rib 12 through the bar 16, said bolts being secured to said rib by nuts 19. At its upper end each of the bolts 18 carries a second nut 20 between which and the top of the bar 16 is interposed a spring 21, washers 22 being preferably interposed between the ends of said spring and said nut and bar respectively.

In assembling the structure, after the bars 10 with the bolts 18 secured thereto have been properly connected to the roof frame members 11, the panes 15 are inserted with their edges resting upon the shoulders 14, the ribs 12 facilitating this operation by guiding the panes into place and assisting in properly positioning the same. The clamping bar 16 is then placed in position on the bolts 18, and the springs 21, washers 22 and nuts 20 applied, said nuts 20 being tightened to compress the springs 21 and cause the lower edges of the side portions 17 of said clamping bar to engage said panes with any desired degree of yielding pressure, thereby securely clamping said panes against the shoulders 14, but without danger of breaking the glass, the springs permitting ample expansion and contraction of the metal parts.

It will be seen, that the structure above described is of a very simple character, the bars 10 and 16 being composed of relatively heavy sheet metal to which the necessary vertical rigidity is imparted by the relatively high rib 12 and the upturned edge portions 14 of the bar 10, and by the relatively wide, downwardly turned side portions 17 of the bar 16. The rib 12 constitutes positive spacing and positioning means for the panes 15 so as not only to facilitate their insertion, as above pointed out, but also to insure their proper engagement with the shoulder 14 and by the clamping portions 17 of the bar 16. The relatively high construction of the clamping bar 16 permits the outwardly inclined side portions 17 thereof to yield outwardly under the clamping pressure, thereby contributing to the flexibility of the holding means and preventing excessive pressure upon the glass due to inadvertent overtightening of the nuts 20, or to expansion and contraction of the holding parts.

Having thus described my invention, I claim:

1. A glass holding structure comprising a supporting bar of relatively heavy sheet metal bent upon itself at substantially its mid width to form an inverted U-shaped vertical longitudinally extending rib, the sides thereof extending laterally away from each other at the lower edge of the rib and the free edges then extending upwardly to form seats for the glass, an inverted V-shaped clamping bar of relatively heavy sheet metal on the upper side of the glass and arranged with its free edges cooperating with the seats to secure the panes of glass therebetween, resilient means above the clamping bar secured to the supporting bar and tending to press the two bars together to hold the glass, and means for varying the pressure of the resilient means.

2. A glass holding structure comprising a supporting bar of relatively heavy sheet metal bent upon itself at substantially its mid width to form an inverted U-shaped vertical longitudinally extending rib, the sides thereof extending laterally away from each other at the lower edge of the rib and the free edges then extending upwardly to form seats for the glass, an inverted V-shaped clamping bar of relatively heavy sheet metal on the upper side of the glass and arranged with its free edges cooperating with the seats to secure the panes of glass therebetween, bolts secured to the top of the rib and extending through the top of the clamping bar and adapted to allow movement of the bar thereon, adjusting nuts on the bolts above the clamping bar, and springs between the nuts and the bar to yieldingly clamp the glass in position.

In testimony whereof I affix my signature.

STEPHEN E. CIBULAS.